(12) United States Patent
Kim et al.

(10) Patent No.: US 7,568,407 B2
(45) Date of Patent: Aug. 4, 2009

(54) PEDAL APPARATUS FOR VEHICLE

(75) Inventors: Kyungmin Kim, Busan (KR); Hojong Oh, Busan (KR); Wonyoung Heo, Ulsan (KR)

(73) Assignee: Donghee Industrial Co. Ltd. (KR)

( * ) Notice: Subject to any disclaimer, the term of this patent is extended or adjusted under 35 U.S.C. 154(b) by 0 days.

(21) Appl. No.: 12/143,767

(22) Filed: Jun. 21, 2008

(65) Prior Publication Data

US 2009/0000418 A1    Jan. 1, 2009

(51) Int. Cl.
*G05G 1/30* (2008.04)
*F16H 53/00* (2006.01)
*F16H 53/06* (2006.01)

(52) U.S. Cl. .............................. 74/512; 74/513; 74/560; 74/567; 74/569

(58) Field of Classification Search ............... 74/54, 74/512–514, 560, 567, 569; 180/335
See application file for complete search history.

(56) References Cited

U.S. PATENT DOCUMENTS

| 3,646,831 | A | * | 3/1972 | Janosi | 74/518 |
|---|---|---|---|---|---|
| 4,800,774 | A | | 1/1989 | Hagiwara et al. | |
| 4,907,468 | A | | 3/1990 | Hagiwara et al. | |
| 6,098,971 | A | * | 8/2000 | Stege et al. | 267/251 |
| 6,250,176 | B1 | * | 6/2001 | Reimann et al. | 74/512 |
| 6,446,526 | B2 | * | 9/2002 | Reimann et al. | 74/512 |
| 6,526,844 | B1 | * | 3/2003 | Weis | 74/513 |
| 7,082,853 | B2 | * | 8/2006 | Fujiwara | 74/512 |
| 7,503,235 | B2 | * | 3/2009 | Podkopayev | 74/512 |
| 2005/0172753 | A1 | * | 8/2005 | Fujiwara | 74/512 |

FOREIGN PATENT DOCUMENTS

| EP | 608155 A1 | * | 7/1994 |
|---|---|---|---|
| JP | 01231106 A | * | 9/1989 |
| JP | 8-305459 A | | 11/1996 |
| KR | 10-2007-0016551 A1 | | 2/2007 |

* cited by examiner

*Primary Examiner*—Richard W L Ridley
*Assistant Examiner*—Thomas Diaz

(57) ABSTRACT

The present invention relates to a pedal apparatus for a vehicle, which makes it possible to reduce the driver's fatigue by reducing the pedal effort when operating the pedal arm and also allows the driver to be able to easily recognize the maximum operational position of the pedal arm.

2 Claims, 9 Drawing Sheets

PEDAL APPARATUS FOR VEHICLE

CROSS-REFERENCE TO RELATED APPLICATION

The benefit of priority of Republic of Korea patent application number 10-2007-0062675, which was filed Jun. 26, 2007, is claimed pursuant to 35 USC §119(b). In addition, the contents of Republic of Korea patent application number 10-2007-0062675 are hereby incorporated by reference in its entirety.

BACKGROUND

1. Field of the Invention

The present invention relates to a pedal apparatus for a vehicle that can be operated by a small pedal effort and allows a driver to easily know the maximum operational position of a pedal arm.

2. Description of the Related Art

In general, a vehicle equipped with an automatic transmission is provided with an accelerator pedal and a brake pedal, while a vehicle equipped with a manual transmission is provided with a clutch pedal for actuating a clutch, in addition to an accelerator pedal and a brake pedal.

The pedals are frequently operated by the driver when the vehicle is traveling and the frequent operation makes the driver tired especially in a long-distance travel.

Therefore, a variety of apparatuses for reducing pedal effort has been developed to reduce the driver's fatigue by reducing the pedal effort for operating the pedal.

However, most apparatuses for reducing pedal effort that have been used in the related art simply reduce the pedal effort for operating the pedal that is applied by the driver and cannot let the driver know the maximum operational position of the pedal.

Pedal apparatuses equipped with a device that is separated from the apparatus for reducing pedal effort and lets the driver know the maximum operational position of the pedal have been developed to overcome the above problem; however, the pedal apparatuses still has a problem in that the cost and the weight are increased.

SUMMARY

An object of the invention is to provide a pedal apparatus for a vehicle that is designed to reduce pedal effort applied when the driver steps on the pedal to pivot the pedal arm, in order to reduce the driver's fatigue, and allow the driver to easily know the maximum operational position of the pedal arm.

In order to accomplish the object, a pedal apparatus for a vehicle of the invention includes: a movable bracket that has an end fixed to a hinge shaft bushing and the other end where an operational rod passes through, and rotates with the hinge shaft bushing when a pedal arm pivots; a driven block that is pivotably attached to a pedal mounting bracket by a shaft bolt at a predetermined position facing the movable bracket and has a continuous curved surface that is always in contact with the operational rod while the pedal arm pivots; and a spring that has an end connected to a spring bracket attached to the pedal arm mounting bracket and the other end connected to the driven block, and applies an elastic force to the driven block such that the operational rod is always in contact with the curved surface

BRIEF DESCRIPTION OF THE DRAWINGS

The above and other features and advantages of the present invention will become more apparent by describing in detail preferred embodiments thereof with reference to the attached drawings in which.

DETAILED DESCRIPTION

Hereinafter, preferred embodiments of the invention are described in detail with reference to the accompanying drawings.

Figure 1:
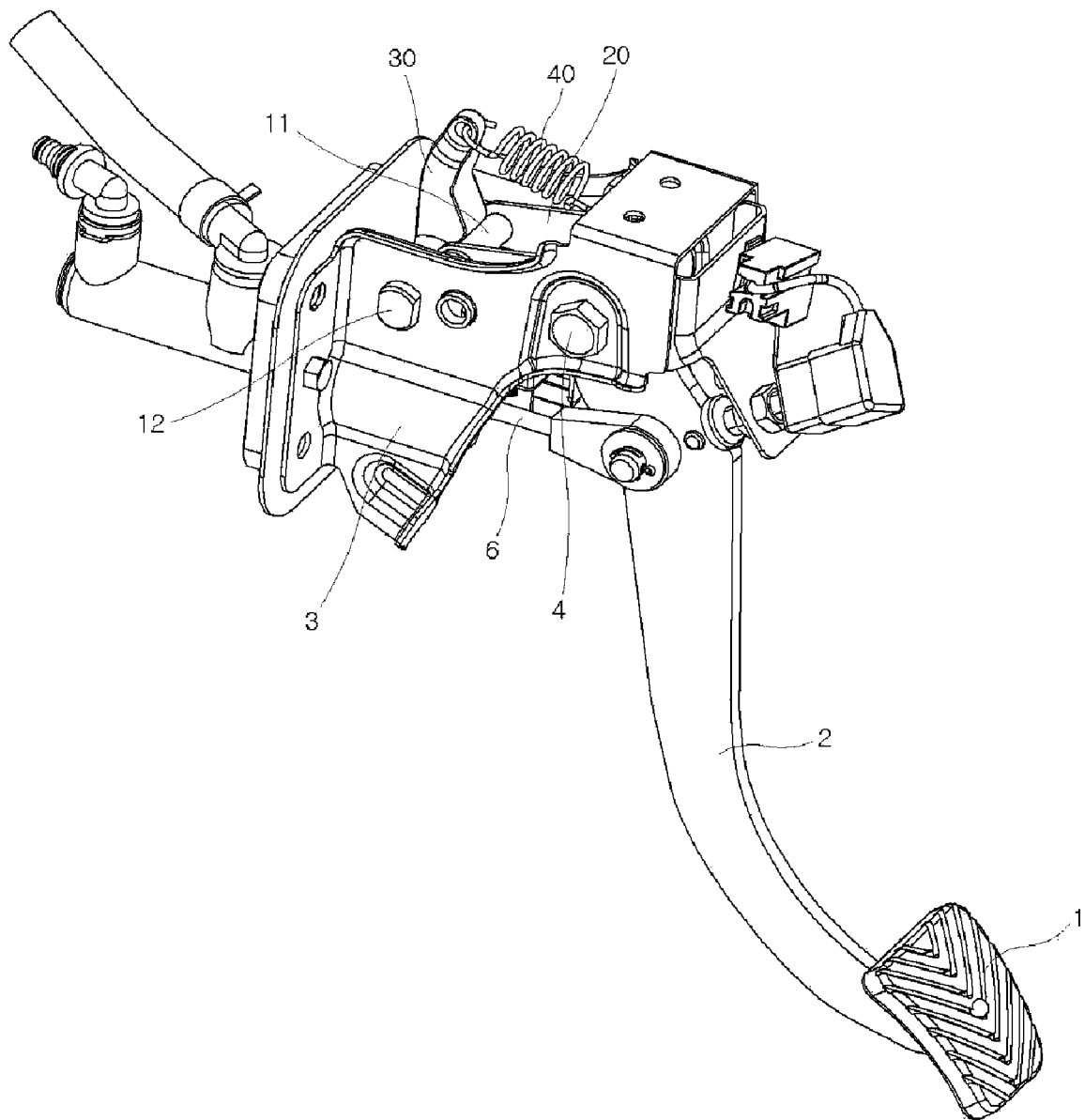
FIGS. 1 and 2 are a perspective view and a side view of a pedal apparatus, respectively, according to the invention.
Figure 2:
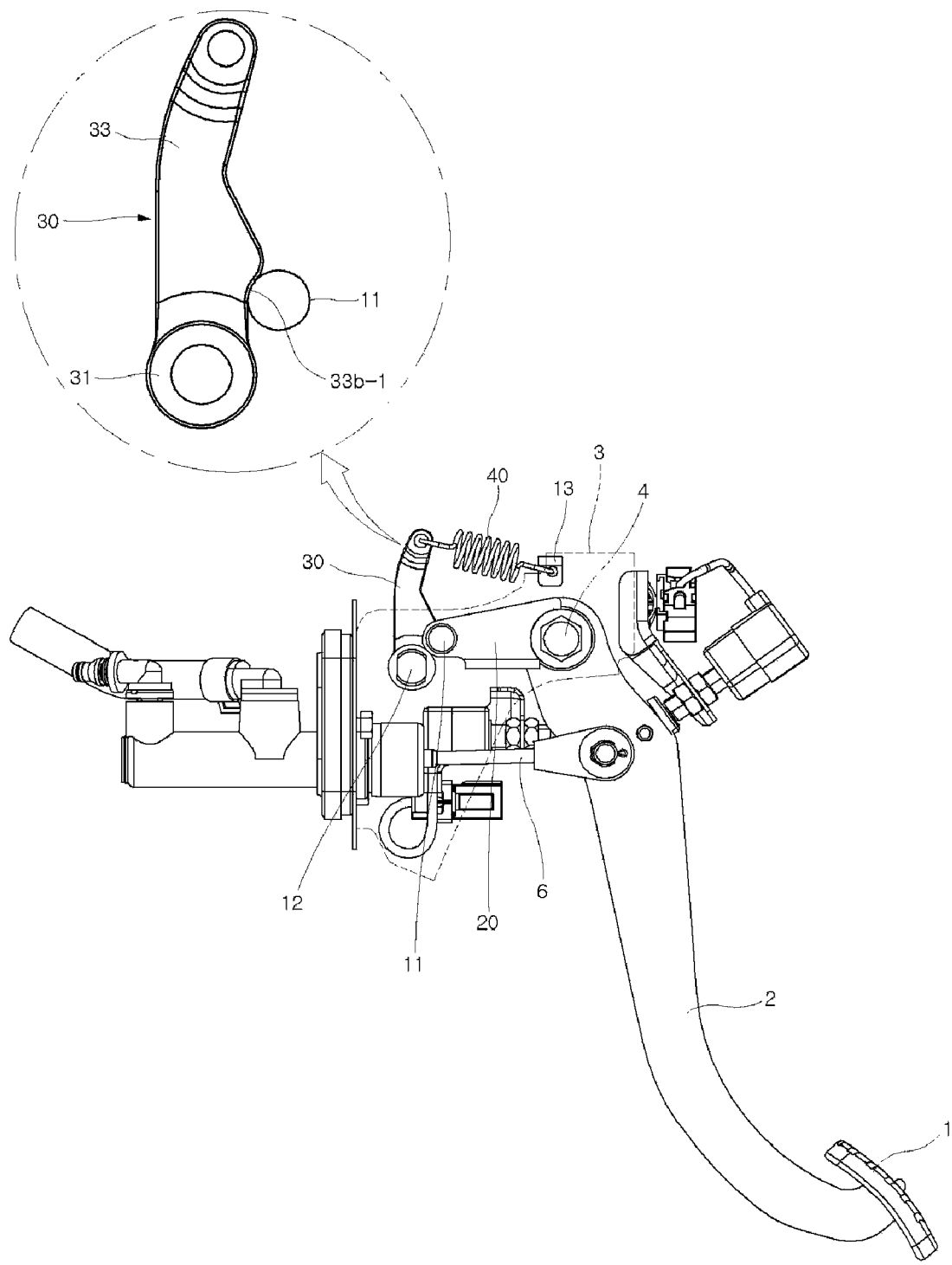
Figure 3:
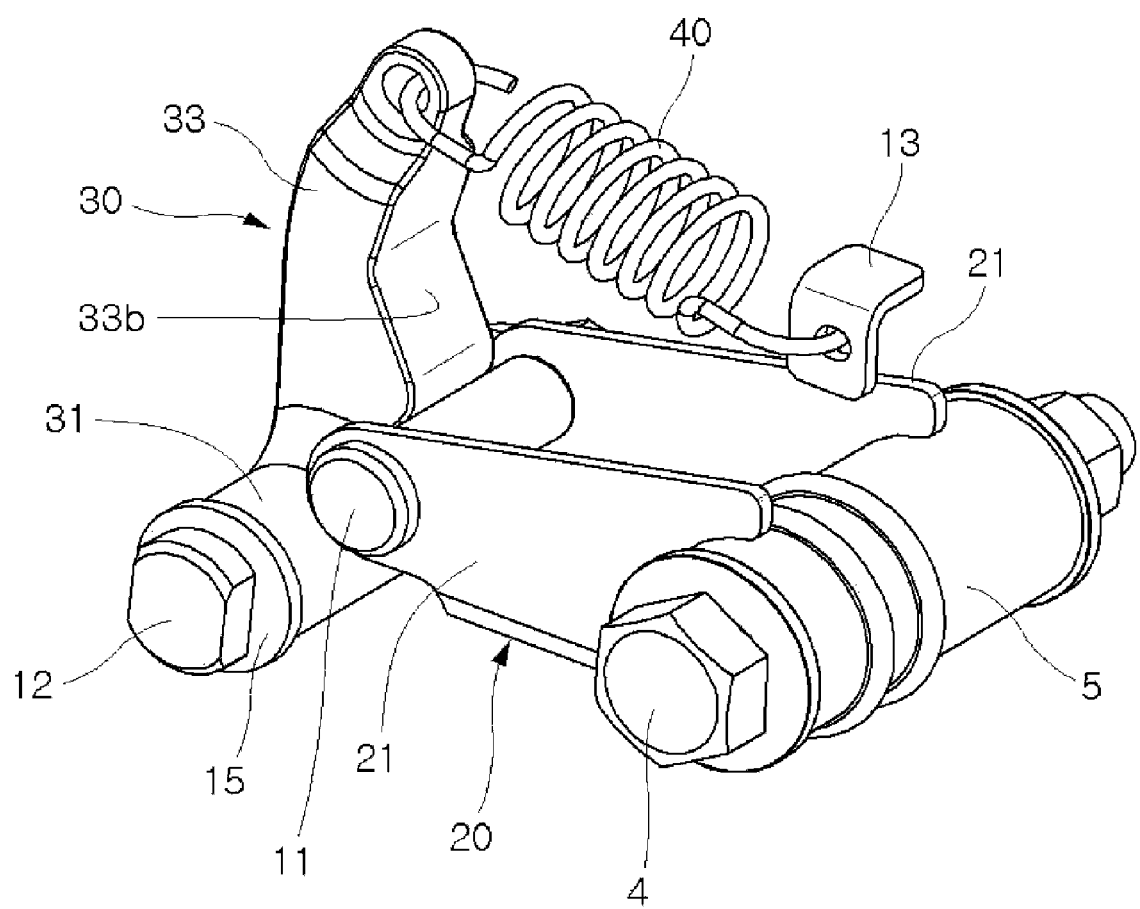
FIGS. 3 and 4 are perspective views illustrating an assembly of a movable bracket, a driven block, and a spring included in the pedal apparatus according to the invention.
Figure 4:
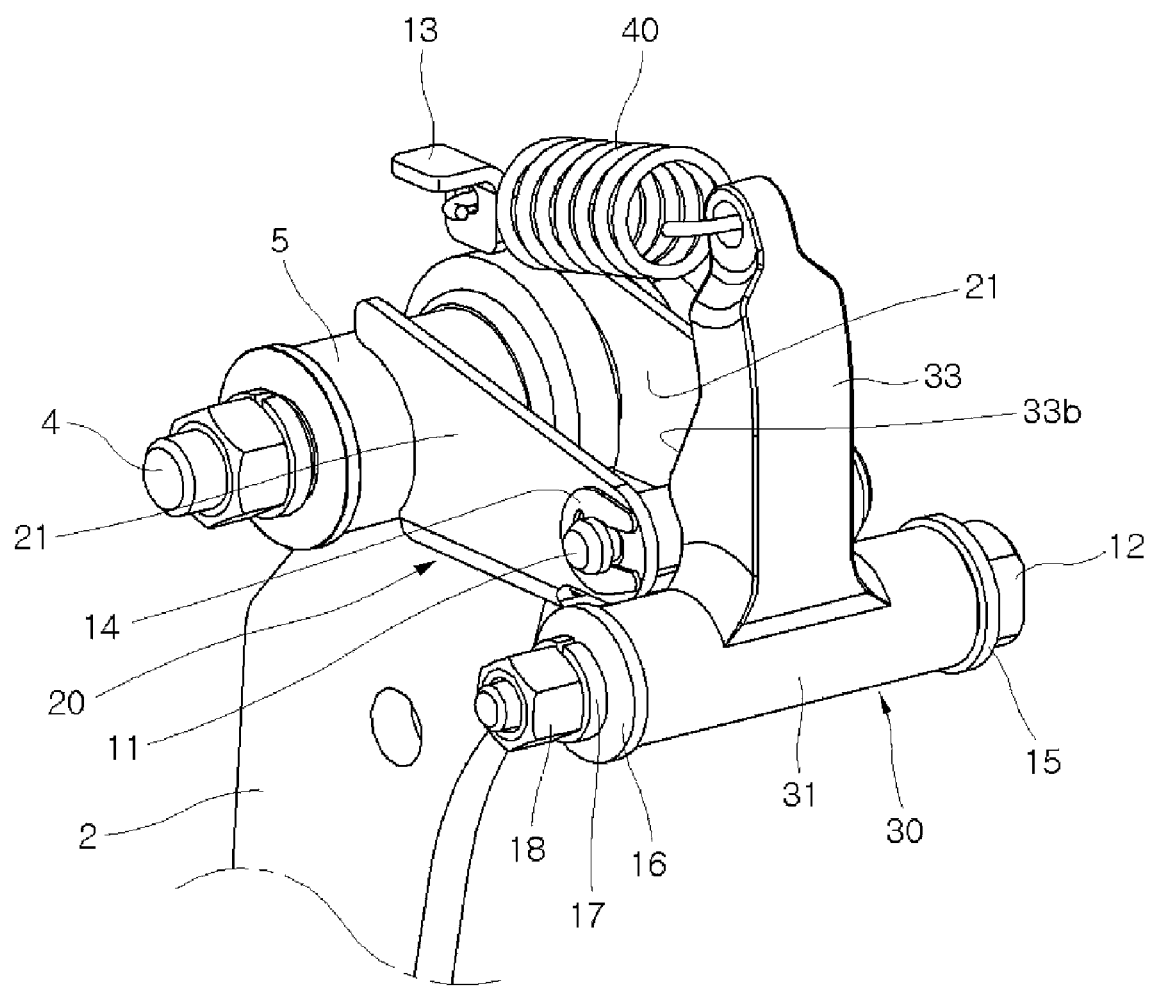
Figure 5:
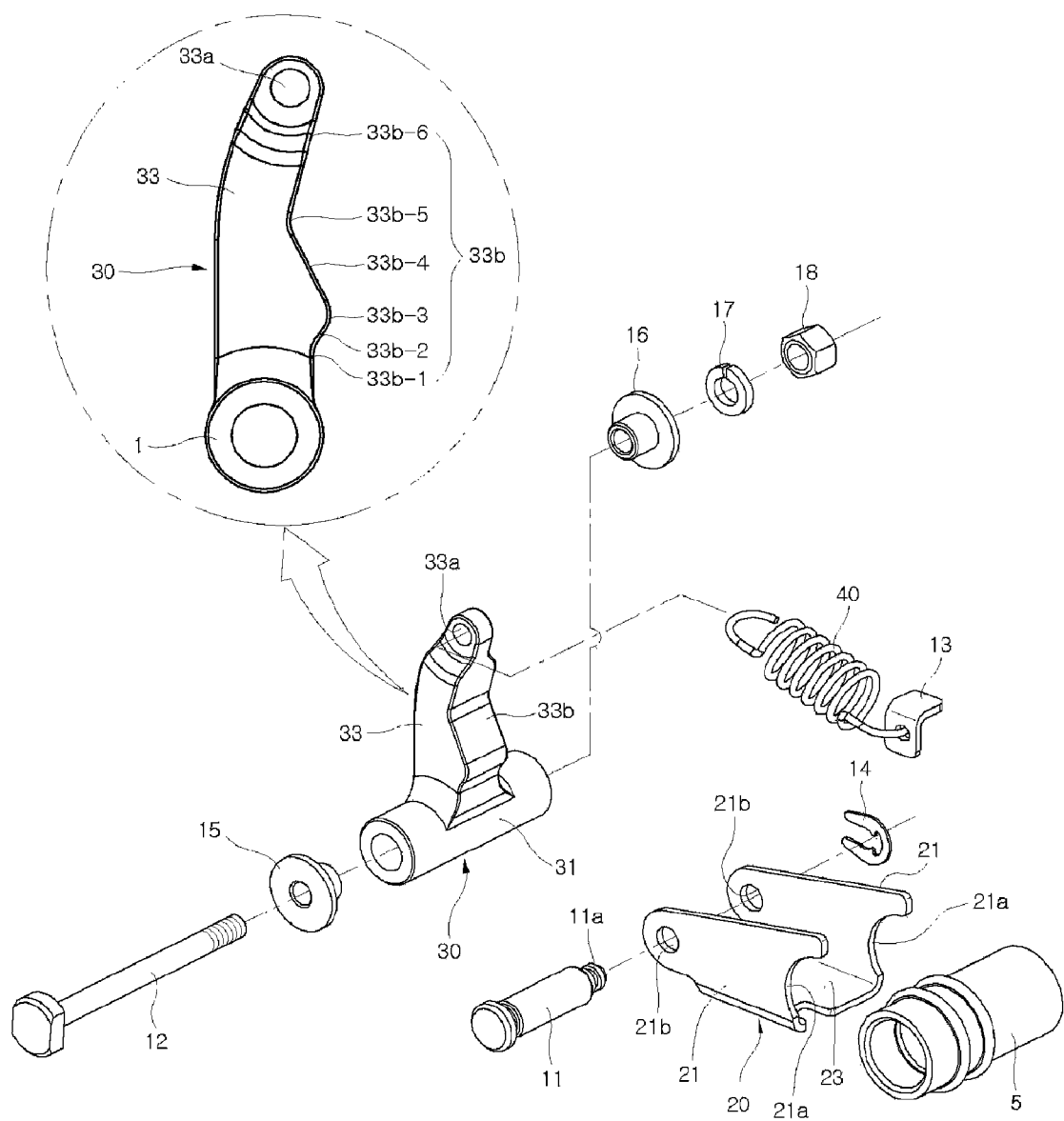
FIG. 5 is an exploded perspective view of FIG. 3.

FIGS. 1 and 2 are a perspective view and a side view of a pedal apparatus, respectively, according to an embodiment of the invention.

According to a pedal apparatus of the invention, as shown in FIGS. 1 to 5, a pedal arm 2 with a pedal 1 is connected to a pedal arm mounting bracket 3 and pivots on a hinge shaft 4.

That is, the hinge shaft 4 of the pedal arm 2 passes through a hinge shaft bushing 5, such that the hinge shaft bushing 5 can rotate about the hinge shaft 4.

Further, the upper end of the pedal arm 2 is fitted around the hinge shaft bushing 5, such that as the pedal arm 2 pivots when a drive steps on the pedal 1, the hinge shaft busing 5 rotates with the pedal arm 2.

The pedal arm 2 is connected with a push rod 6, which is connected with the brake booster of a brake apparatus or a master cylinder of a clutch assembly.

Meanwhile, the pedal apparatus according to the invention includes: a movable bracket 20 that has an end fixed to the hinge shaft bushing 5 and the other end where an operational rod 11 passes through, and rotates with the hinge shaft bushing 5 when the pedal arm 2 pivots; a driven block 30 that is pivotably attached to the pedal arm mounting bracket 3 by a shaft bolt 12 at a predetermined position facing the movable bracket 20 and has a continuous curved surface 33b that is always in contact with the operational rod 11 while the pedal arm 2 pivots; and a spring 40 that has an end connected to a spring bracket 13 attached to the pedal arm mounting bracket 3 and the other end connected to the driven block 30, and applies an elastic force to the driven block 30 such that the operational rod 11 is always in contact with the curved surface 33b.

The spring bracket 13 is fixed to the inner wall of the pedal arm mounting bracket 3 by welding at a predetermined position spaced apart upward from the hinge shaft bushing 5.

Further, the movable bracket 20 is composed of a pair of side panels 21 and a bottom panel 23. The side panel 21 has an arc-shaped surface 21a that is in contact with the outer surface of the hinge shaft bushing 5 at an end and a rod hole 21b where the operational rod is inserted at the other end, and the bottom panel 23 is integrally formed with the side panels 21 such that the side panels 21 are connected.

The operational rod 11 passes through the side panels 21 and is fixed by an elastic clip 14, and a clip groove 11a is formed around the outer circumference at an end of the operational rod 11.

Further, the driven block 30 has a cylindrical pipe 31 where the shaft bolt 12 is inserted, and a pipe extension 33 that extends from the cylindrical pipe 31 and has the continuous curved surface 33*b* that is in contact with the operational rod 11 and a spring hole 33*a* at an end where the other end of the spring 40 is inserted.

Pipe bushings 15, 16 are fitted in both ends of the cylindrical pipe 31, the shaft bolt 12 passes through the pedal arm mounting bracket 3, the pipe bushings 15, 16, and the cylindrical pipe 31. Further, a spring washer 17 and a nut 18 are sequentially fitted around the end of the shaft bolt 12 that protrudes from a side of the pedal arm mounting bracket 3 through the cylindrical pipe 31.

On the other hand, the curved surface 33*b* of the pipe extension 33 is formed in a continuous wave shape and has: an initial placing surface 33*b*-1 that is formed close to the cylindrical pipe 31 and where the operational rod 11 is positioned when the pedal arm is at the initial position; a first slope 33*b*-2 that is inclined upward and backward from the initial placing surface 33*b*-1 to a gradually increasing reaction force to the pedal arm while being in contact with the operational rod 11; a protruding surface 33*b*-3 that is the peak extending from the first slope 33*b*-2 and applies the maximum reaction force to the pedal arm 2 while being in contacting with the operational rod 11; a second slope 33*b*-4 that is inclined upward and forward the protruding surface 33*b*-3 to gradually decrease the reaction force applied to the pedal arm 2 while being in contact with the operational rod 11; an intermediate placing surface 33*b*-5 that is the most recessed portion extending from the second slope 33*b*-4 and does not applies a reaction force to the pedal arm 2 while being in contact with the operational rod 11, and a third slope 33*b*-6 that is inclined upward and backward and extends from the intermediate placing surface 33*b*-5 to the end with the spring hole 33*a* to apply a gradually increasing reaction force again to the pedal arm 2 while being in contact with the operational rod 11.

The effect and operation of an embodiment of the invention are described hereafter.

FIG. 2 shows a position when the pedal 1 is not pushed by a driver, in which the pedal arm 2 is at the initial position, not pivoting about the hinge shaft 4.

At the initial position shown in FIG. 2, the operational rod 11 is positioned at the initial placing surface 33*b*-1 of the curved surface 33*b* of the pipe extension 33 and the spring 40 is not extended at the initial position.

Figure 6:
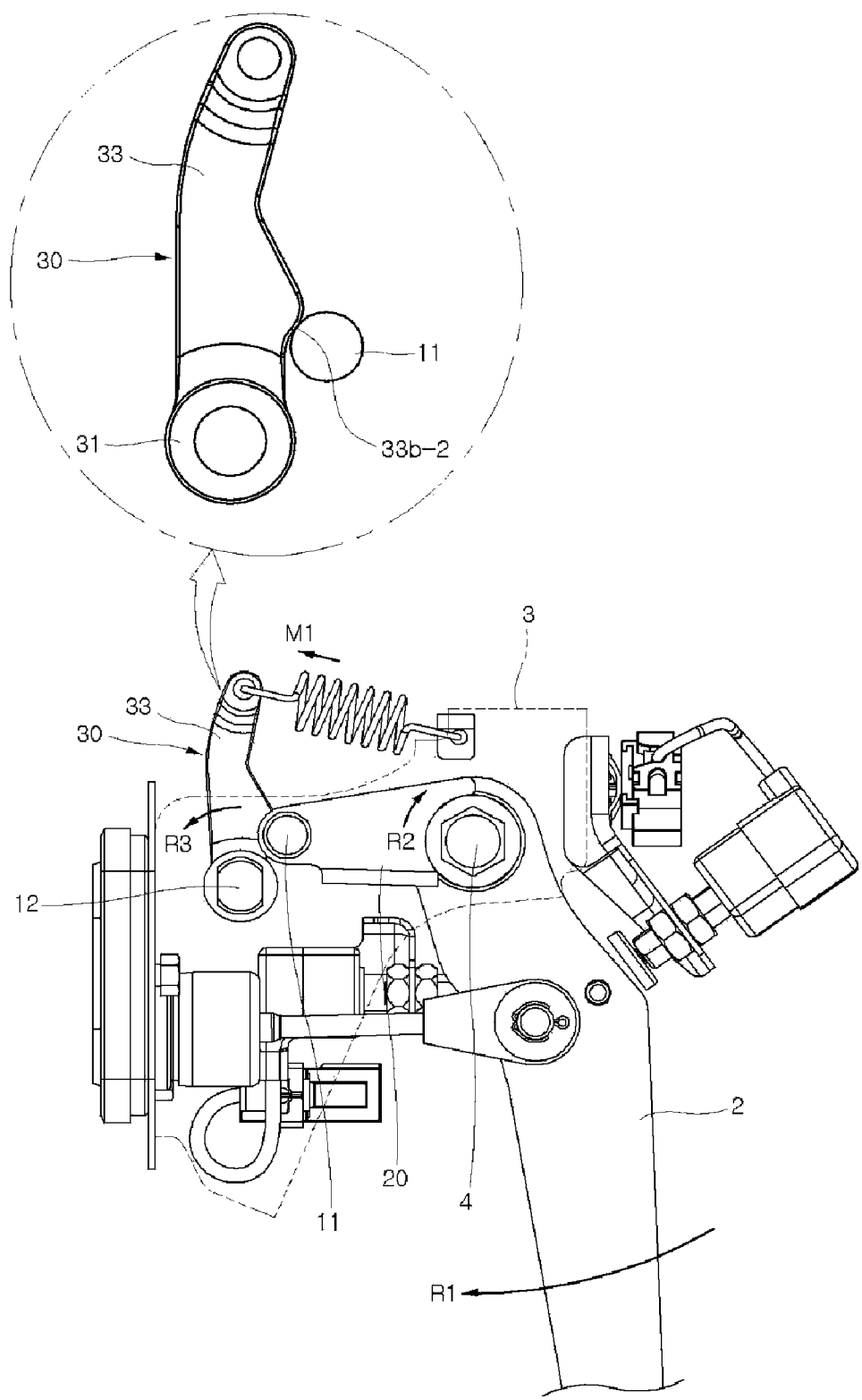
FIGS. 6 to 9 are views illustrating the operation of the pedal apparatus according to the invention.

As the driver steps on the pedal 1 to apply a load to the pedal arm 2 in the position shown in FIG. 2, the pedal arm 2 pivots forward about the hinge shaft 4, i.e. in the direction of arrow R1 shown in FIG. 6.

As the pedal arm 2 pivots, the movable bracket 20 pivots in the direction of arrow R2 shown in FIG. 6, such that the operational rod 11 moves to the first slope 33*b*-2 of the curved surface 33*b* of the pipe extension 33.

As the operational rod 11 moves to the first slope 33*b*-2, the driven block 30 pivots counterclockwise about the shaft bolt 12, i.e. in the direction of arrow R3, by a pushing force of the operational rod 11 and the spring 40 extends in the direction of arrow M1 from the initial position shown in FIG. 2 and a tensile force is exerted.

When the tensile force is exerted in the spring 40, a force that pivots the driven block 20 clockwise, i.e. in the opposite direction to the arrow R3, by an elastic return force is exerted, and accordingly, the pivot force of the driven block 30 exerted clockwise, i.e. in the opposite direction to the arrow R3 is transmitted to the pedal arm 2 through the movable bracket 20 and the hinge shaft bushing 5.

Accordingly, a reaction force is exerted in the pedal arm 2 in the opposite direction to the load applied to the pedal arm 2, such that the driver gradually increases the load, i.e. the pedal effort applied to the pedal arm 2 in consideration of the magnitude of the reaction force. Therefore, the driver feels the reaction force transmitted through the pedal arm 2 and recognizes the operational position of the pedal arm 2.

Figure 7:
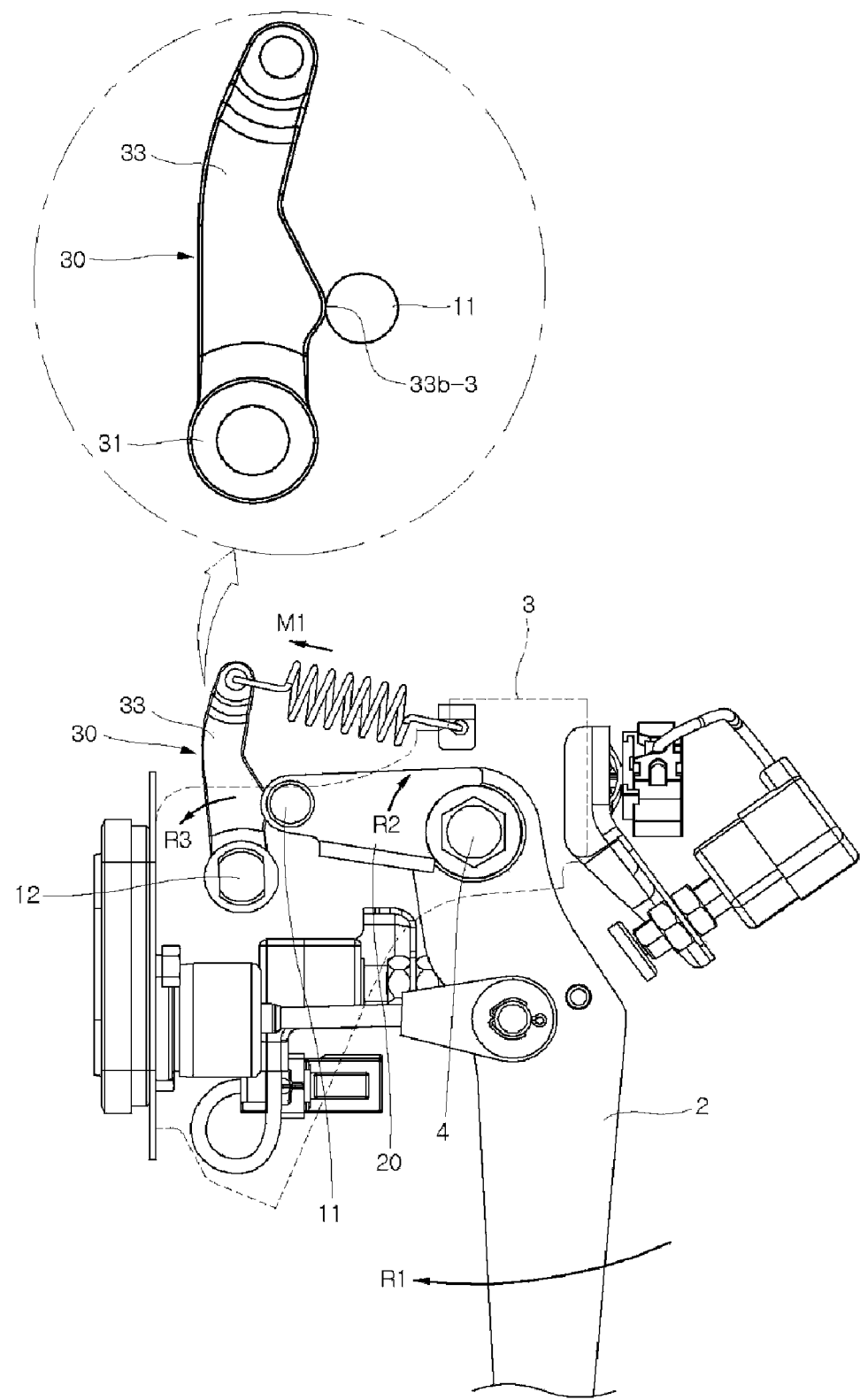

As the driver further pushes the pedal 1 to further pivot the pedal arm 2 from the position shown in FIG. 6 to the position shown in FIG. 7, the movable bracket 20 further pivots from the position shown in FIG. 6, such that the operational rod 11 moves to the protruding surface 33*b*-3 of the curved surface 33*b* of the pipe extension 33.

When the operational rod 11 is positioned on the protruding surface 33*b*-3, the driven block 30 pivots counterclockwise about the shaft bolt 12 and reaches the maximum pivot point, in which the spring 40 is extended from the position shown in FIG. 6 and the maximum tensile force is exerted.

When the tensile force exerted in the spring 40 is the maximum, the force that pivots the driven block 30 in the opposite direction is the maximum, such that the reaction force transmitted to the pedal arm is also the maximum and the driver's pedal effort applied to the pedal 7 is the maximum as well.

Further, as the driver further pushes the pedal 1 to further pivot the pedal arm 2 from the position shown in FIG. 7, the movable bracket 20 further pivots in the same direction from the position shown in FIG. 7, while the operational rod 11 contacts to the second slope 33*b*-4 from the protruding surface 33*b*-3.

When the operational rod 11 is in contact with the second slope 33*b*-4, the spring 40 where the maximum tensile force has been exerted is a little compressed, such that the driven block 30 pivots clockwise a little about the shaft bolt 12.

Therefore, the reaction force transmitted to the pedal arm 2 is a little reduced than that at the position shown in FIG. 7, such that the pedal effort applied by the driver stepping on the pedal 1 is gradually decreased while the operational rod 11 moves along the second slope 33*b*-4.

Figure 8:
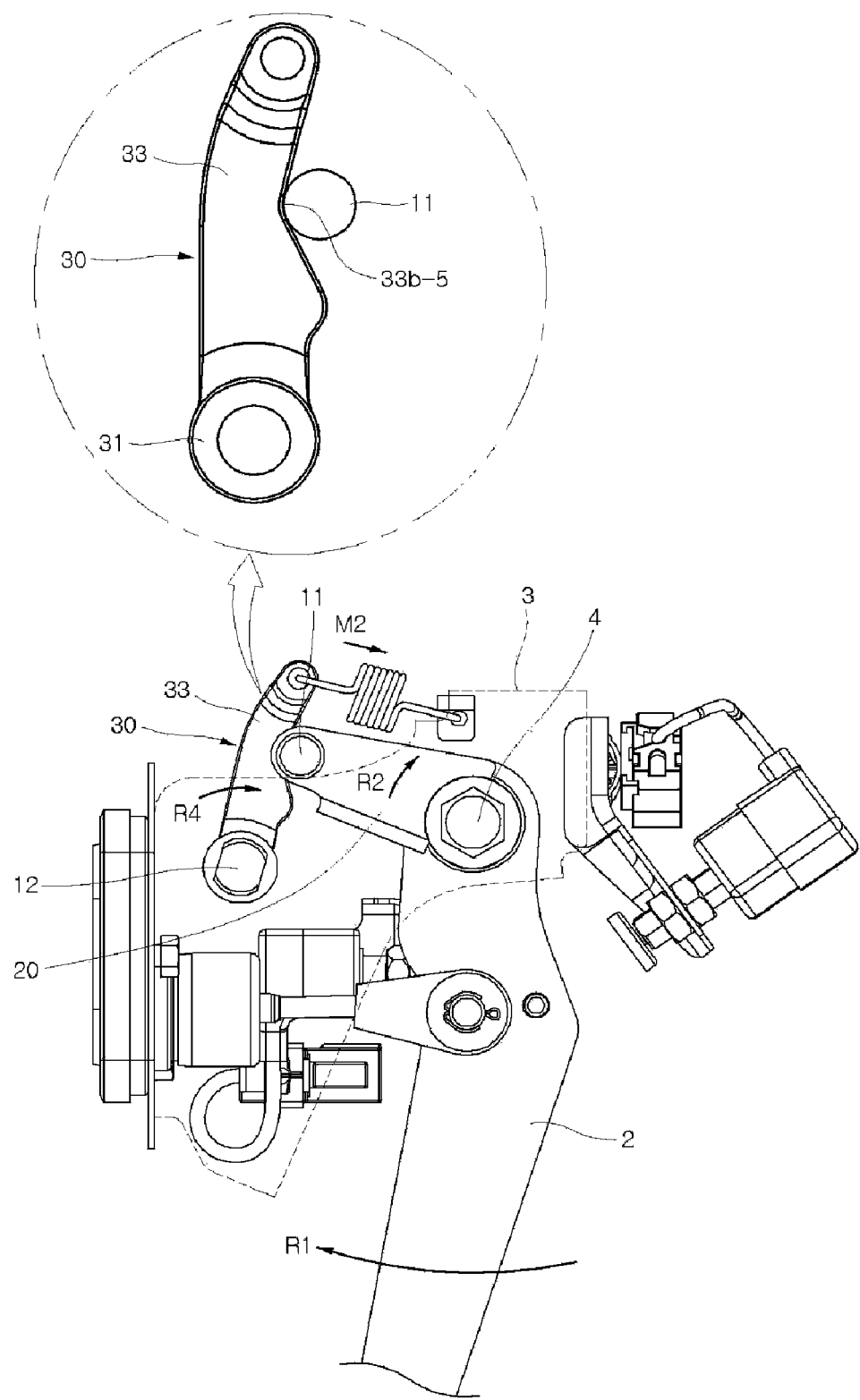

In the above position, as the driver further pushes the pedal 1 to further pivot the pedal arm to the position shown in FIG. 8, the operational rod 11 moves the intermediate placing surface 33*b*-5 from the second slope 33*b*-4.

When the operational rod 11 is positioned on the intermediate placing surface 33*b*-5, the spring 40 returns to the initial position, where the length is not changed, as shown in FIG. 2 and the driven block 30 correspondingly pivots clockwise, i.e. the direction of arrow R4 and returns to the initial position as shown in FIG. 2.

As described above, when the spring 40 and the driven block 30 reach the initial positions, the reaction force transmitted to the pedal arm is removed and the pedal effort applied by the driver stepping on the pedal 1 is decreased to the minimum.

Accordingly, the driver's fatigue is reduced when operating the pedal arm 2 as the pedal effort is decreased, such that the operational sensitivity is improved.

Figure 9:
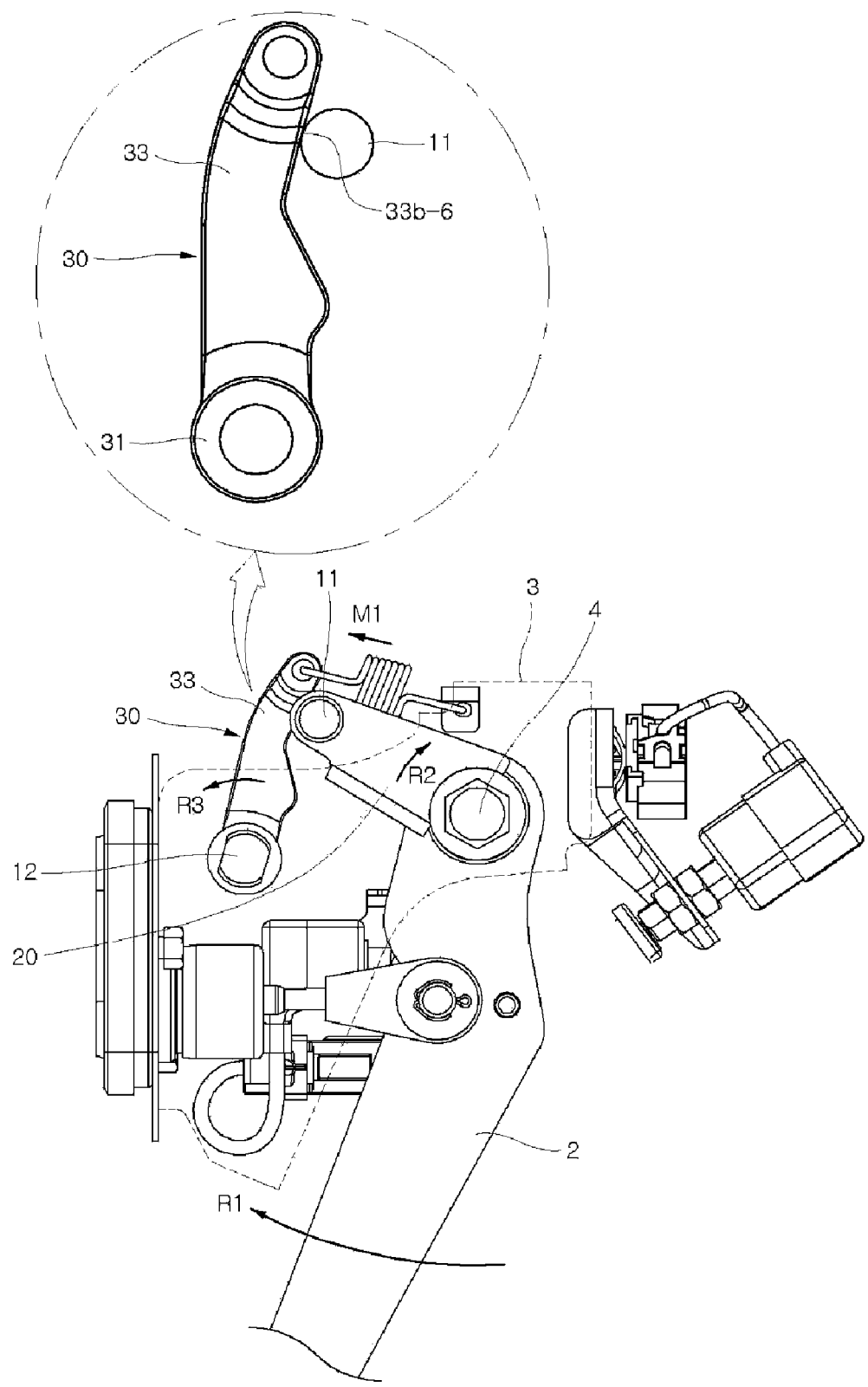

Finally, as the driver further pushes the pedal 1 to further pivot the pedal arm 2 from the position shown in FIG. 8 to the position shown in FIG. 9, the operational rod 11 moves to the third slope 33*b*-6 from the intermediate placing surface 33*b*-5.

When the operational rod 11 is positioned on the third slope 33*b*-6, the driven block 30 pivots counterclockwise, i.e. in the direction of arrow R3 and the spring 40 correspondingly is compressed in the opposite direction to the direction of M1 and a tensile force is exerted in the spring 40 with the length increased a little.

When the tensile force is exerted in the spring 40, the reaction force is applied again to the pedal arm 2 as described above with reference to FIG. 6 and the driver increases again the pedal effort applied to the pedal arm 2 in consideration of the reaction force.

Therefore, the driver can easily recognizes the maximum operational position of the pedal arm 2 from the re-increased pedal effort, such that the driver doesn't need to apply unnecessary pedal effort to the pedal arm 2 after the pedal arm 2 reaches the maximum operational position. As a result, it is possible to reduce the driver's fatigue when operating the pedal arm 2.

As described above, according to the invention, it is possible to reduce the driver's fatigue by reducing the pedal effort when operating the pedal arm and also allow the driver to be able to easily recognize the maximum operational position of the pedal arm.

What is claimed is:

1. A pedal apparatus for a vehicle comprising:
   a movable bracket that has an end fixed to a hinge shaft bushing and the other end where an operational rod passes through, and rotates with the hinge shaft bushing when a pedal arm pivots;
   a driven block that is pivotably attached to a pedal arm mounting bracket by a shaft bolt at a predetermined position facing the movable bracket and has a continuous curved surface that is always in contact with the operational rod while the pedal arm pivots; and
   a spring that has an end connected to a spring bracket attached to the pedal arm mounting bracket and the other end connected to the driven block, and applies an elastic force to the driven block such that the operational rod is always in contact with the curved surface,
   wherein the driven block has a cylindrical pipe where the shaft bolt is inserted, and a pipe extension that extends from the cylindrical pipe and has the continuous curved surface that is in contact with the operational rod and a spring hole at an end where the other end of the spring is inserted,
   wherein the curved surface has: an initial placing surface that is formed close to the cylindrical pipe and where the operational rod is positioned when the pedal arm is at the initial position, a first slope that is inclined upward and backward from the initial placing surface to apply a gradually increasing reaction force to the pedal arm while being in contact with the operational rod, a protruding surface that is the peak extending from the first slope and applies the maximum reaction force to the pedal arm while being in contact with the operational rod, a second slope that is inclined upward and forward from the protruding surface to gradually decrease the reaction force applied to the pedal arm while being in contact with the operational rod, an intermediate placing surface that is the most recessed portion extending from the second slope and does not apply a reaction force to the pedal arm while being in contact with the operational rod, and a third slope that is inclined upward and backward and extends from the intermediate placing surface to the end with the spring hole to apply a gradually increasing reaction force again to the pedal arm while being in contact with the operational rod.

2. The pedal apparatus as set forth in claim 1, wherein the movable bracket has:
   a pair of side panels that each has an arc-shaped surface that is in contact with the outer surface of the hinge shaft bushing at an end and a rod hole where the operational rod is inserted at the other end; and
   a bottom panel that is integrally formed with the side panels such that the side panels are connected.

* * * * *